United States Patent
Li et al.

(10) Patent No.: US 9,221,317 B1
(45) Date of Patent: Dec. 29, 2015

(54) RELEASABLE CHASSIS MOUNT

(71) Applicant: GM GLOBAL TECHNOLOGY OPERATIONS LLC, Detroit, MI (US)

(72) Inventors: Yunjun Li, West Bloomfield, MI (US); Soo Aun Tan, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/447,957

(22) Filed: Jul. 31, 2014

(51) Int. Cl.
*B62D 21/11* (2006.01)
*B62D 27/06* (2006.01)
*B60G 99/00* (2010.01)

(52) U.S. Cl.
CPC .............. *B60G 99/002* (2013.01); *B62D 21/11* (2013.01); *B62D 27/06* (2013.01)

(58) Field of Classification Search
CPC ........ B62D 21/11; B62D 24/00; B62D 24/02; B62D 24/04; B62D 27/04; B62D 27/06; B62D 27/065; B62D 33/06; B62D 33/0604
USPC .................................. 296/35.1–35.3, 190.07
See application file for complete search history.

(56) References Cited

U.S. PATENT DOCUMENTS

| | | | | |
|---|---|---|---|---|
| 4,043,585 | A * | 8/1977 | Yamanaka | 296/35.1 |
| 6,017,073 | A * | 1/2000 | Lindblom et al. | 296/35.1 |
| 6,692,052 | B1 * | 2/2004 | Sutton et al. | 296/35.2 |
| 6,820,908 | B1 * | 11/2004 | Tousi et al. | 296/35.1 |
| 7,185,934 | B2 * | 3/2007 | Saeki | 296/35.2 |
| 7,416,242 | B2 * | 8/2008 | Godfrey et al. | 296/187.08 |
| 7,922,157 | B2 * | 4/2011 | Hayashi et al. | 267/141.2 |
| 2005/0073166 | A1 * | 4/2005 | Snyder | 296/35.1 |
| 2009/0102218 | A1 * | 4/2009 | Fernandez et al. | 296/35.1 |
| 2013/0081897 | A1 * | 4/2013 | Dandekar et al. | 180/291 |
| 2015/0166111 | A1 * | 6/2015 | Stojkovic | 296/35.1 |

* cited by examiner

*Primary Examiner* — Gregory Blankenship
(74) *Attorney, Agent, or Firm* — Quinn Law Group, PLLC

(57) ABSTRACT

A releasable chassis mount for a vehicle having a body structure and a chassis and subjectable to an external force includes an outer sleeve, a cylindrical insert, and a chassis bolt. The outer sleeve is attachable to the chassis and has a mount release feature. The cylindrical insert is in an interference fit relationship with the outer sleeve and defines a hole. The chassis bolt extends through the hole for attaching the cylindrical insert to the body structure. The mount release feature is configured to initiate release of the cylindrical insert from the outer sleeve during such external force, whereby to enable the separation of the chassis from the body structure.

20 Claims, 3 Drawing Sheets

RELEASABLE CHASSIS MOUNT

TECHNICAL FIELD

This disclosure for a vehicle relates to a chassis mount that releases when the vehicle is subjected to an external force.

BACKGROUND

Vehicles may be subjectable to an external force. It may be beneficial to release the chassis from the body structure during such external force. It may also be beneficial to achieve this without adding mass and without changing the vehicle assembly process.

SUMMARY

A releasable chassis mount for a vehicle having a body structure and a chassis and subjectable to an external force is provided. The releasable chassis mount includes an outer sleeve, a cylindrical insert, and a chassis bolt. The outer sleeve is attachable to the chassis and has a mount release feature. The cylindrical insert is in an interference fit relationship with the outer sleeve and defines a hole. The chassis bolt extends through the hole for attaching the cylindrical insert to the body structure. The mount release feature is configured to initiate release of the cylindrical insert from the outer sleeve during such external force, whereby to enable the separation of the chassis from the body structure.

A vehicle is also provided. The vehicle is subjectable to an external force and has a body structure, a chassis or front cradle, and a releasable chassis mount. The releasable chassis mount has an outer sleeve, a cylindrical insert, and a chassis bolt. The outer sleeve has a mount release feature and is welded to the chassis. The cylindrical insert is in an interference fit relationship with the outer sleeve and defines a hole. The chassis bolt extends through the hole for attaching the cylindrical insert to the body structure. The mount release feature is configured as a notch to initiate and facilitate release of the cylindrical insert from the outer sleeve during such external force, whereby to enable the separation of the chassis from the body structure.

The releasable chassis mount enables the release of the chassis from the body structure of a vehicle when the vehicle is subjected to an external force. This is achieved without adding mass to the vehicle and without changing the vehicle assembly process.

The above features and advantages and other features and advantages of the present teachings are readily apparent from the following detailed description of the best modes for carrying out the present teachings when taken in connection with the accompanying drawings.

DETAILED DESCRIPTION

Figure 1:
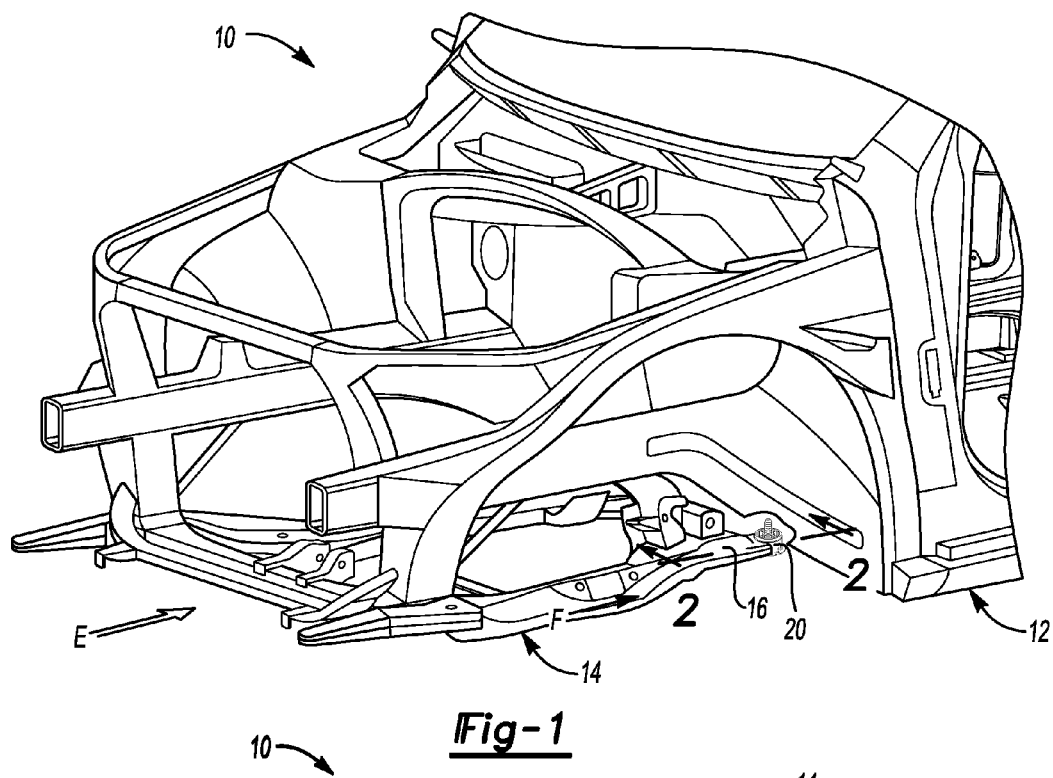
FIG. 1 is a fragmentary schematic perspective illustration of a vehicle having a body structure, a chassis, and a releasable chassis mount, with part of the body structure removed for clarity in the area of the releasable chassis mount.

Referring to the drawings, wherein like reference numbers refer to like components throughout the views, FIG. 1 shows a vehicle 10 having a body structure 12 and a cradle or chassis 14. The vehicle 10 is subjectable to an external force E. The vehicle 10 includes a releasable cradle or chassis mount 20. The cradle or chassis 14 may include a chassis rail 16. When the vehicle is subjected to the external force E, a chassis rail force F may result.

Figure 2:
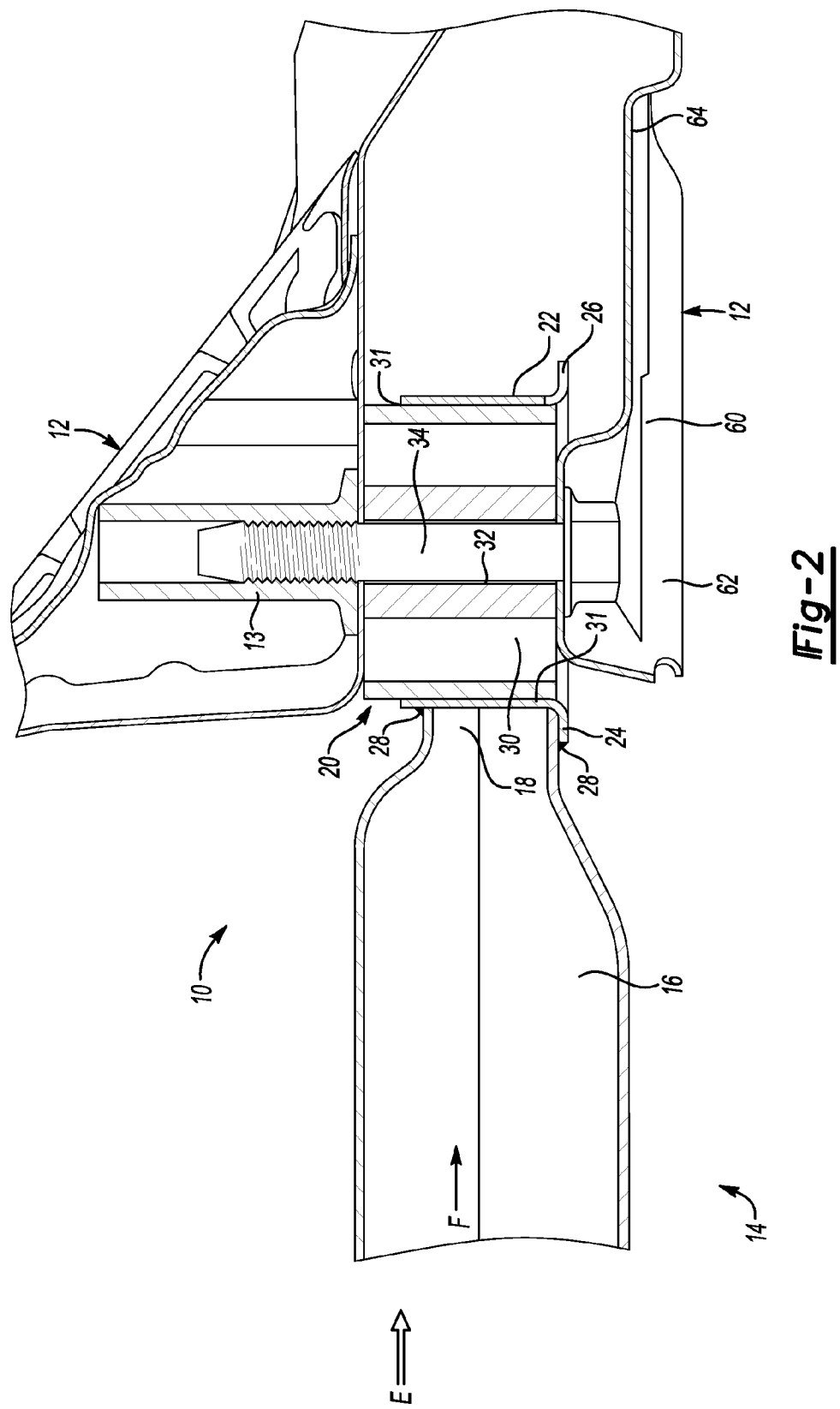
FIG. 2 is a fragmentary schematic cross-section, partially in elevation, of the vehicle along the line 2-2 in FIG. 1 and through the releasable chassis mount.

Referring now to FIG. 2, the releasable chassis mount 20 has an outer sleeve 22, a cylindrical insert 30, and a chassis bolt 34. The outer sleeve 22 is attachable to the cradle or chassis 14 and has a mount release or pull out feature 26. The cylindrical insert 30 is in an interference fit relationship at interface 31 with the outer sleeve 22 and defines a hole 32. The chassis bolt 34 extends through the hole 32 for attaching the cylindrical insert 30 to the body structure 12.

The mount release feature 26 is configured to initiate or facilitate the release or pull out of the cylindrical insert 30 from the outer sleeve 22 during such external force E to initiate the separation of the chassis or cradle 14 from the body structure 12. More specifically, the mount release feature 26 may initiate or facilitate one or more of a crack in the outer sleeve 22, a fracture of the outer sleeve 22, and a deformation of the outer sleeve 22, so that the cylindrical insert 30 may be released from or pulled out of the outer sleeve 22 and the cradle 14 may be separated from the body structure 12. The chassis bolt 34 may be threaded into a threaded portion 13 of the body structure 12 to attach the cylindrical insert 30 to the body structure 12.

The outer sleeve 22 may include a lower flange 24 extending radially outward from the outer sleeve 22. The outer sleeve 22 may be made of steel, aluminum, or any other suitable metal or non-metal. The cradle or chassis rail 16 may be made of steel, aluminum, or any other suitable metal or non-metal. The outer sleeve 22 may be welded to the cradle or chassis 14 via a weld 28.

The chassis rail 16 may include an end 18. The outer sleeve 22 may be attached to the chassis rail 16 at the end 18. The outer sleeve 22 may be welded to the chassis 14 at the rail end 18. The rail end 18 may be configured to cooperate with the mount release feature 26 to initiate or facilitate the release of the cylindrical insert 30 from the outer sleeve 22 during such external force E. The mount release feature 26 may be positioned as appropriate relative to the rail end 18 to initiate or facilitate the release of the cylindrical insert 30 from the outer sleeve 22 during such external force E.

The vehicle 10 may include a stabilizer bracket 60 attachable to the body structure 12 so as to become part of the body structure 12. The stabilizer bracket 60 may also be attachable to the releasable chassis mount 20 via the chassis bolt 34. The stabilizer bracket 60 may include a first portion 62 and a second portion 64. The first portion 62 may be attached to the chassis mount cylindrical insert 30 via the chassis bolt 34. The second portion 64 may be attached to the body structure 12 with fasteners or with any other suitable structural attachment.

Figure 3:
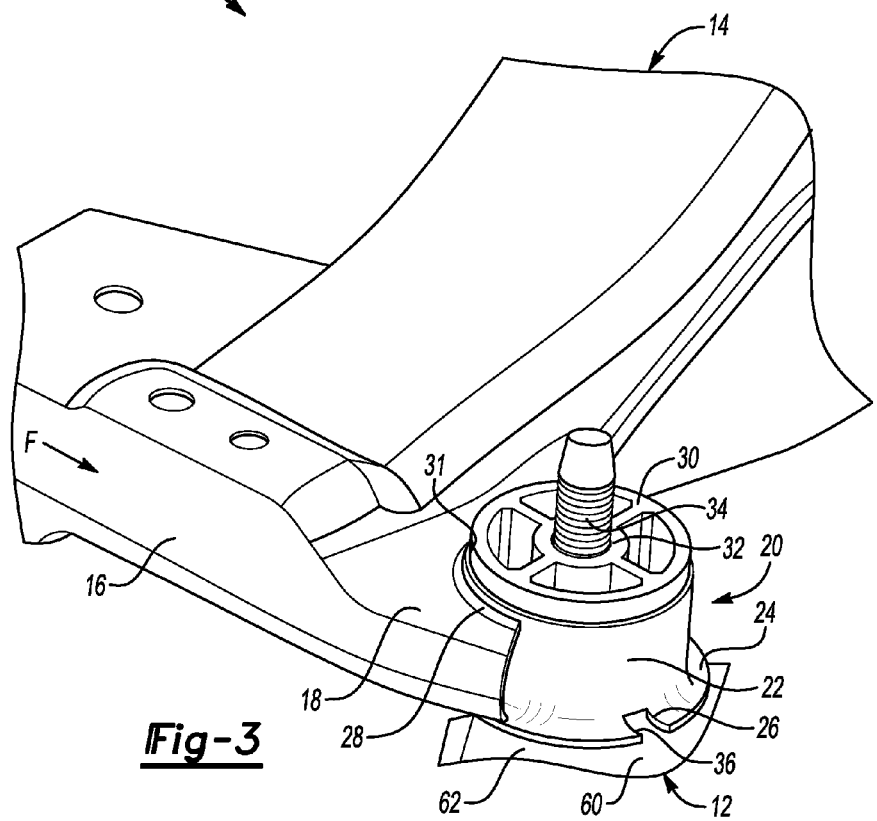
FIG. 3 is a fragmentary schematic perspective illustration of the vehicle of FIG. 1 in the area of the releasable chassis mount and with the body structure removed except for a stabilizer bracket to show the releasable chassis mount with greater clarity.

Referring now to FIG. 3, the mount release or pull out feature 26 may include a notch 36 formed in the outer sleeve 22. The notch 36 may be formed in the lower flange 24. The notch 36 may be rectangular, triangular, round or any other suitable shape. In other embodiments (not shown), the notch 36 may extend into a portion of the outer sleeve 22 that may have a reduced thickness relative to the balance of the outer sleeve 22.

Figure 4A:
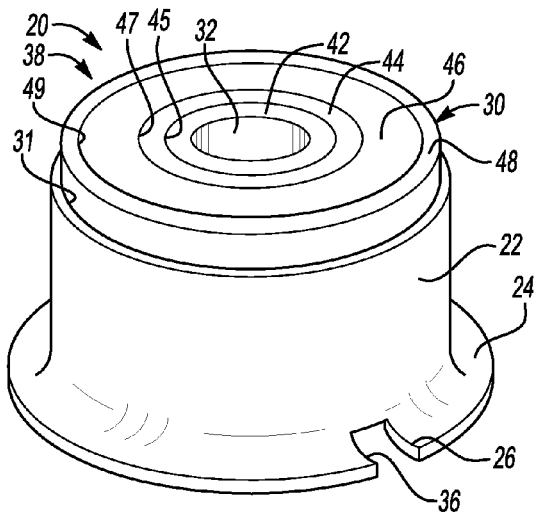
FIG. 4A is a schematic perspective illustration of one embodiment of the releasable chassis mount of FIG. 1, wherein the releasable chassis mount has a release feature that includes a notch in an isolated chassis mount.
Figure 4B:
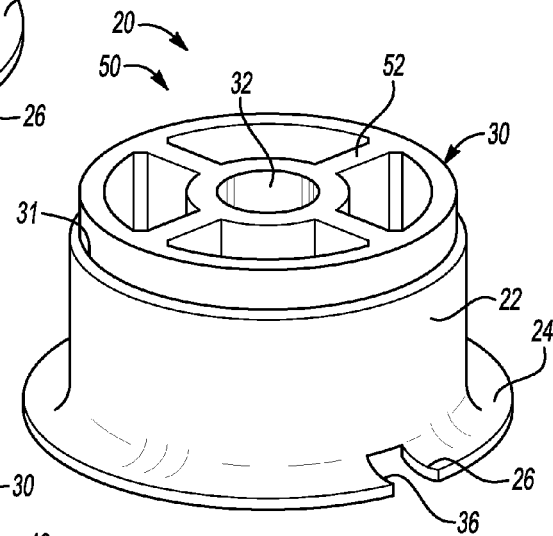
FIG. 4B is a schematic perspective illustration of another embodiment of the releasable chassis mount of FIG. 1 wherein the releasable chassis mount has a release feature that includes the notch in a non-isolated chassis mount.

Referring now to FIGS. 4A-4B, the releasable chassis mount 20 may be an isolated chassis mount 38, as shown in FIG. 4A, or a non-isolated chassis mount 50, as shown in FIG. 4B. The isolated chassis mount 38 cylindrical insert 30 includes a resilient portion 46 for isolating the chassis 14 from the body structure 12. The non-isolated chassis mount 50 cylindrical insert 30 does not include a resilient portion.

Referring now to FIG. 4A, the cylindrical insert 30 includes a resilient portion 46 such that the releasable chassis or cradle mount 20 is configured as an isolated chassis mount 38. In the isolated chassis mount 38, the cylindrical insert 30 may include an inner sleeve 42, a resilient portion support 44, a resilient portion 46, and an insert outer sleeve 48. The inner sleeve 42 may form the hole 32. The resilient portion support 44 may be disposed between the inner sleeve 42 and the resilient portion 46. The resilient portion 46 may be disposed between the resilient portion support 44 and the insert outer sleeve 48. The insert outer sleeve 48 may form the radial outer surface of the cylindrical insert 30. The inner sleeve 42 may be made of a metal or a non-metal. The resilient portion support 44 may be made of a metal or a non-metal. The resilient portion 46 may be made of a non-metal including, but not limited to, a plastic, a rubber, or an elastomer. The insert outer sleeve 48 may be made of a metal or a non-metal.

The inner sleeve 42 may be attached to the resilient portion support 44. The resilient portion support 44 may be attached to the resilient portion 46. And, the resilient portion 46 may be attached to the insert outer sleeve 48. The attachment between the inner sleeve 42 and the resilient portion support 44 may be an adhesive bond, an interference fit relationship, a mechanical interlock, or any other suitable attachment at interface 45. The attachment between the resilient portion support 44 and the resilient portion 46 may be an interference fit relationship, a mechanical interlock, or any other suitable attachment at interface 47. And, the attachment between the resilient portion 46 and the insert outer sleeve 48 may be an adhesive bond, an interference fit relationship, a mechanical interlock, or any other suitable attachment at interface 49.

Referring now to FIG. 4B, the cylindrical insert 30, as in FIGS. 2 and 3, does not include a resilient portion 46 such that the releasable chassis or cradle mount 20 is configured as a non-isolated chassis mount 50. Thus, the non-isolated chassis mount 50 cylindrical insert 30 has a non-resilient insert 52, such as in FIG. 2-3. The non-resilient insert 52 may be made of a metal or a non-metal. The non-resilient insert 52 may be formed or molded as a single piece or may be an assembly of multiple pieces.

Figure 5A:
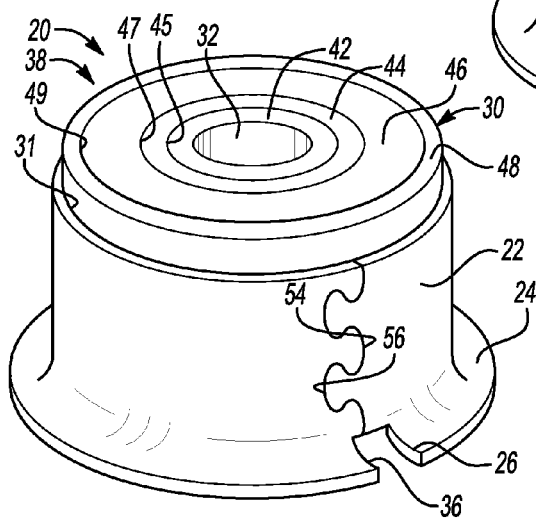
FIG. 5A is a schematic perspective illustration of another embodiment of the releasable chassis mount of FIG. 1 wherein the releasable chassis mount has a release feature that includes an interlock extending from the notch in the isolated chassis mount.
Figure 5B:
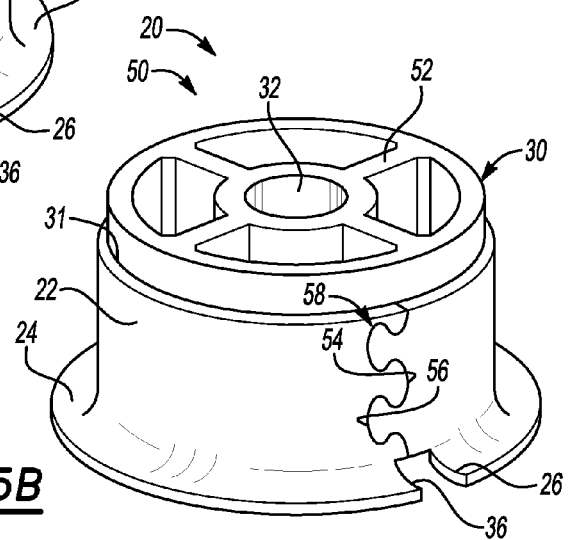
FIG. 5B is a schematic perspective illustration of another embodiment of the releasable chassis mount of FIG. 1 wherein the releasable chassis mount has a release feature that includes the interlock extending from the notch in the non-isolated chassis mount.

Referring now the FIGS. 5A-B, in these embodiments, the mount release or pull out feature 26 includes first and second interlocking edges 54, 56 on the outer sleeve 22. The respective interlocking edges 54, 56 on the outer sleeve 22 are configured to cooperate sufficiently with one another to create an interlock 58 in the outer sleeve 22. The interlock 58 is releasable or pulled apart during such external force E to separate the cradle or chassis 14 from the vehicle 10 body structure 12. The first and second interlocking edges 54, 56 may be rounded (as shown), angular, T-shaped, L-shaped, J-shaped, or any other suitable interlocking shape and may extend from the notch 36 in the lower flange 24 of the outer sleeve 22. Thus, the isolated chassis mount 38, as shown in FIG. 5A, and the non-isolated chassis mount 50, as shown in FIG. 5B, enable the separation of the chassis 14 from the body structure 12 of the vehicle 10 during the external force E.

The releasable chassis mount 20 may be used in one or more locations where the chassis or cradle 14 is mounted to the body structure 12. For a vehicle 10 that has a front chassis or cradle 14, as shown in FIG. 1, the releasable chassis or cradle mount 20 may be used in one or more mounting locations at or near the rear end of the chassis or cradle 14.

In operation and as shown in FIGS. 1 and 2, when the vehicle 10 is subjected to the external force E, the resultant chassis rail force F may be applied to the releasable chassis mount 20 by the chassis rail 16. When the chassis rail force F reaches a predetermined level, the mount release feature 26 initiates release of the cylindrical insert 30 from the outer sleeve 22 as the notch 36 in the flange 24 initiates a fracture in the sleeve 22 and/or a disengagement of the interlocking edges 54, 56. The outer sleeve 22 then separates from the cylindrical insert 30 and the bolt 34, which may bend, releasing the chassis or cradle 14 from the body structure 12 in the area of the releasable chassis mount 20. If the vehicle 10 includes a stabilizer bracket 60 having portions 62 and 64, the chassis bolt 34 may be pulled out of the portion 62 of the stabilizer bracket 60 as the outer sleeve 22 separates from the cylindrical insert 30.

The releasable chassis mount 20 may also be applied to the chassis mounts for a rear chassis on a vehicle 10.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A releasable chassis mount for a vehicle having a body structure and a chassis and subjectable to an external force, the releasable chassis mount comprising:
    an outer sleeve attachable to the chassis and having a mount release feature;
    a cylindrical insert in an interference fit relationship with the outer sleeve and defining a hole; and
    a chassis bolt extending through the hole for attaching the cylindrical insert to the body structure;
    wherein the mount release feature is configured to initiate release of the cylindrical insert from the outer sleeve during such external force, whereby to enable the separation of the chassis from the body structure.

2. The releasable chassis mount of claim 1, wherein the mount release feature includes a notch formed in the outer sleeve.

3. The releasable chassis mount of claim 2, wherein the outer sleeve includes a lower flange extending radially outward from the outer sleeve.

4. The releasable chassis mount of claim 3, wherein the mount release feature includes a notch formed in the lower flange.

5. The releasable chassis mount of claim 3, wherein the notch is configured to include first and second interlocking edges on the outer sleeve; and wherein the respective interlocking edges on the outer sleeve are configured to cooperate sufficiently with one another to create an interlock in the outer sleeve that is releasable during such external force.

6. The releasable chassis mount of claim 5, wherein the notch is further configured to extend into the lower flange.

7. The releasable chassis mount of claim 3, wherein the outer sleeve is weldable to the chassis.

8. The releasable chassis mount of claim 7, wherein the cylindrical insert includes a resilient portion such that the releasable chassis mount is configured as an isolated chassis mount.

9. The releasable chassis mount of claim 7, wherein the cylindrical insert does not include a resilient portion such that the releasable chassis mount is configured as a non-isolated chassis mount.

10. A vehicle, comprising:
   a body structure;
   a chassis; and
   a releasable chassis mount having:
      an outer sleeve including a mount release feature and welded to the chassis;
      a cylindrical insert in an interference fit relationship with the outer sleeve and defining a hole; and
      a chassis bolt extending through the hole and attaching the cylindrical insert to the body structure;
      wherein the mount release feature is configured to initiate release of the cylindrical insert from the outer sleeve during application of an external force, whereby to enable the separation of the chassis from the body structure.

11. The vehicle of claim 10, wherein the mount release feature includes a notch formed in the outer sleeve.

12. The vehicle of claim 11, wherein the outer sleeve includes a lower flange extending radially outward from the outer sleeve.

13. The vehicle of claim 12, wherein the mount release feature includes a notch formed in the lower flange.

14. The vehicle of claim 12, wherein the notch is configured to include first and second interlocking edges on the outer sleeve; and wherein the respective interlocking edges on the outer sleeve are configured to cooperate sufficiently with one another to create an interlock in the outer sleeve that is releasable during such external force.

15. The vehicle of claim 14, wherein the notch is further configured to extend into the lower flange.

16. The vehicle of claim 12, wherein the chassis includes a rail end; wherein the outer sleeve is welded to the chassis at the rail end; and wherein the rail end is configured to cooperate with the mount release feature to initiate the release of the cylindrical insert from the outer sleeve during such external force.

17. The vehicle of claim 16, wherein the mount release feature is positioned relative to the rail end to initiate the release of the cylindrical insert from the outer sleeve during such external force.

18. The vehicle of claim 12, further comprising a stabilizer bracket attachable to the releasable chassis mount via the chassis bolt and attachable to the body structure.

19. The vehicle of claim 12, wherein the cylindrical insert includes a resilient portion such that the releasable chassis mount is configured as an isolated chassis mount.

20. The vehicle of claim 12, wherein the cylindrical insert does not include a resilient portion such that the releasable chassis mount is configured as a non-isolated chassis mount.

* * * * *